US012545390B2

(12) United States Patent
Salmon et al.

(10) Patent No.: US 12,545,390 B2
(45) **Date of Patent: *Feb. 10, 2026**

(54) BIDIRECTIONAL WIRELESS CONTROLS FOR MARINE DEVICES

(71) Applicant: Johnson Outdoors Inc., Racine, WI (US)

(72) Inventors: Paul D. Salmon, Mankato, MN (US); David M. Samek, Eagle Lake, MN (US)

(73) Assignee: Johnson Outdoors Inc., Racine, WI (US)

( * ) Notice: Subject to any disclaimer, the term of this patent is extended or adjusted under 35 U.S.C. 154(b) by 617 days.

This patent is subject to a terminal disclaimer.

(21) Appl. No.: 17/526,308

(22) Filed: Nov. 15, 2021

(65) Prior Publication Data

US 2022/0073180 A1 Mar. 10, 2022

Related U.S. Application Data

(63) Continuation of application No. 16/431,424, filed on Jun. 4, 2019, now Pat. No. 11,173,996, which is a (Continued)

(51) Int. Cl.
*B63H 21/21* (2006.01)
*B63B 17/00* (2006.01)
(Continued)

(52) U.S. Cl.
CPC ............. *B63H 21/21* (2013.01); *B63B 17/00* (2013.01); *B63H 1/04* (2013.01); *B63H 21/17* (2013.01);
(Continued)

(58) Field of Classification Search
CPC .......... B63H 21/21; B63H 1/04; B63H 21/17; B63H 21/213; B63H 21/22; B63H 21/24; B63B 17/00; G08C 17/02; G08C 2201/50
(Continued)

(56) References Cited

U.S. PATENT DOCUMENTS

| | | | |
|---|---|---|---|
| 4,614,900 | A | 9/1986 | Young |
| 5,509,369 | A | 4/1996 | Ford et al. |

(Continued)

OTHER PUBLICATIONS

U.S. Appl. No. 11/888,945, filed Aug. 3, 2007, Abandoned.
(Continued)

*Primary Examiner* — Isaac G Smith
(74) *Attorney, Agent, or Firm* — Reinhart Boerner Van Deuren P.C.

(57) ABSTRACT

A control system for a trolling motor operated based upon commands generated by a wireless remote control device and a wired foot pedal is provided. The controller is interposed between the trolling motor and the wired foot pedal to add wireless controllability to the trolling motor via the wireless remote control. The controller communicates with the remote control through a bidirectional wireless communication link to receive commands and to provide status information on the operation of the motor. The remote control includes user inputs for generating commands that are sent wirelessly to the controller to control operation of the marine device. The remote control also includes a display for displaying real time status information that is received wirelessly from the controller. The controller generates control signals upon receipt of wireless communication from the remote control that simulate signals that are normally generated by the wired foot pedal.

19 Claims, 11 Drawing Sheets

Related U.S. Application Data continuation of application No. 14/337,942, filed on Jul. 22, 2014, now abandoned, which is a continuation of application No. 11/888,945, filed on Aug. 3, 2007, now abandoned.

(51) Int. Cl.

| | |
|---|---|
| ***B63H 1/04*** | (2006.01) |
| ***B63H 21/00*** | (2006.01) |
| ***B63H 21/17*** | (2006.01) |
| ***B63H 21/22*** | (2006.01) |
| ***G08C 17/02*** | (2006.01) |

(52) U.S. Cl.

CPC ........... *B63H 21/213* (2013.01); *B63H 21/22* (2013.01); *B63H 21/24* (2013.01); *G08C 17/02* (2013.01); *G08C 2201/50* (2013.01)

(58) Field of Classification Search

USPC ............................................................ 701/21

See application file for complete search history.

(56) References Cited

U.S. PATENT DOCUMENTS

| | | | | |
|---|---|---|---|---|
| 5,525,081 | A * | 6/1996 | Mardesich | B63H 20/007 440/6 |
| 5,632,217 | A | 5/1997 | Ford et al. | |
| 5,797,339 | A | 8/1998 | Moore et al. | |
| 5,832,440 | A | 11/1998 | Woodbridge et al. | |
| 5,892,338 | A | 4/1999 | Moore et al. | |
| 6,054,831 | A * | 4/2000 | Moore | G08C 17/02 318/16 |
| 6,132,267 | A | 10/2000 | Campbell | |
| 6,481,525 | B1 | 11/2002 | Bloch et al. | |
| 6,487,983 | B1 | 12/2002 | Jönsson et al. | |
| 6,493,616 | B1 | 12/2002 | Rossow et al. | |
| 6,568,341 | B1 | 5/2003 | Sosa | |
| 6,667,934 | B1 | 12/2003 | Healey | |
| 6,678,589 | B2 | 1/2004 | Robertson et al. | |
| 6,855,016 | B1 | 2/2005 | Jansen | |
| 6,909,946 | B1 | 6/2005 | Kabel et al. | |
| 6,962,513 | B2 | 11/2005 | Kimata et al. | |
| 7,143,363 | B1 | 11/2006 | Gaynor et al. | |
| 7,150,662 | B1 * | 12/2006 | Janitz | B63H 25/42 114/144 RE |
| 7,381,108 | B1 | 6/2008 | Salmon | |
| 7,467,596 | B2 | 12/2008 | Salmon | |
| 7,497,748 | B2 | 3/2009 | Salmon | |
| 10,604,222 | B1 * | 3/2020 | Salisbury | B63H 21/21 |
| 2003/0093196 | A1 * | 5/2003 | Okuyama | B63H 21/213 440/2 |
| 2003/0191562 | A1 | 10/2003 | Robertson et al. | |
| 2004/0181322 | A1 | 9/2004 | Okuyama | |
| 2004/0227484 | A1 | 11/2004 | DePasqua | |
| 2004/0257275 | A1 | 12/2004 | Yee et al. | |
| 2005/0288833 | A1 | 12/2005 | Motose | |
| 2006/0089794 | A1 * | 4/2006 | DePasqua | G01C 21/203 701/532 |
| 2007/0027628 | A1 | 2/2007 | Geelen | |
| 2007/0091860 | A1 * | 4/2007 | Lery | G08C 25/00 370/392 |
| 2008/0169779 | A1 | 7/2008 | Samek | |
| 2013/0341030 | A1 | 12/2013 | Brannon et al. | |

OTHER PUBLICATIONS

U.S. Appl. No. 14/337,942, filed Jul. 22, 2014, Abandoned.

U.S. Appl. No. 16/431,424, filed Jun. 4, 2019, Patented.

"Digital Remote DRC Owner's Manual", 2004, *Motorguide*, 14 pages.

"2006 Motorguide Catalog", 2006, *Motorguide*, 14 pages.

"Wireless Series Owner's Instruction Manual", 2005, *Motorguide*, 36 pages.

"MotorGuide Digital Remote Control for Wireless Series Trolling Motors", 2016, *Bass Pro Shops*, 4 pages. http://www.basspro.com/MotorGuide-Digital-Remote-Control-for-Wireless-Series-Trolling-Motors/product/74648/.

* cited by examiner

BIDIRECTIONAL WIRELESS CONTROLS FOR MARINE DEVICES

CROSS-REFERENCE TO RELATED PATENT APPLICATIONS

This patent application is a continuation of co-pending U.S. patent application Ser. No. 16/431,424, filed Jun. 4, 2019, now allowed, which is a continuation of U.S. patent application Ser. No. 14/337,942, filed Jul. 22, 2014, now abandoned, which is a continuation of U.S. patent application Ser. No. 11/888,945, filed Aug. 3, 2007, now abandoned, the teachings and disclosure of which are incorporated herein in their entireties by reference thereto.

BACKGROUND OF THE INVENTION

The present invention relates to systems and methods for controlling of a marine device, such as an electric trolling motor, a downrigger, or trim tabs, using a wireless remote control.

Electric trolling motors are available that are controlled by hand using a tiller, by a foot pedal that is connected to the trolling motor, by wireless foot pedal control, and by hand held remote control devices. Wireless remote control devices have the advantage of eliminating cables that can otherwise get in the way of the angler, and provide the opportunity for the angler to control operation of the motor even when the angler is in another part of the boat. With systems using wireless remote control, the remote control transmits commands to a receiver that is connected to the motor. The angler must observe the motor to decide if the motor has received the command, which may involve steering, turning the propeller on or off, and either increasing or decreasing motor speed. In some situations, the angler may forget the last setting for the propeller on-off control or for the speed. At lower speeds and in windy conditions, it is sometimes difficult to know whether the propeller either is on or off.

Similar issues exist with remote control of other marine devices, such as trim tabs, downriggers, and sonar devices. It can be difficult for the angler to know the current operational status of the marine device when wireless remote control is being used

BRIEF SUMMARY OF THE INVENTION

A display is incorporated into a remote control to display real time status information for marine devices, such as trolling motors, trim tabs or downriggers. This is accomplished by the use of a bidirectional wireless communication link between the remote control and a device controller connected to the marine device. The remote control transmits commands to the device controller to control operation of the marine device. The device controller transmits signals back to the remote control to periodically update the remote control with status information regarding operation of the marine device.

DETAILED DESCRIPTION OF THE INVENTION

Figure 1:
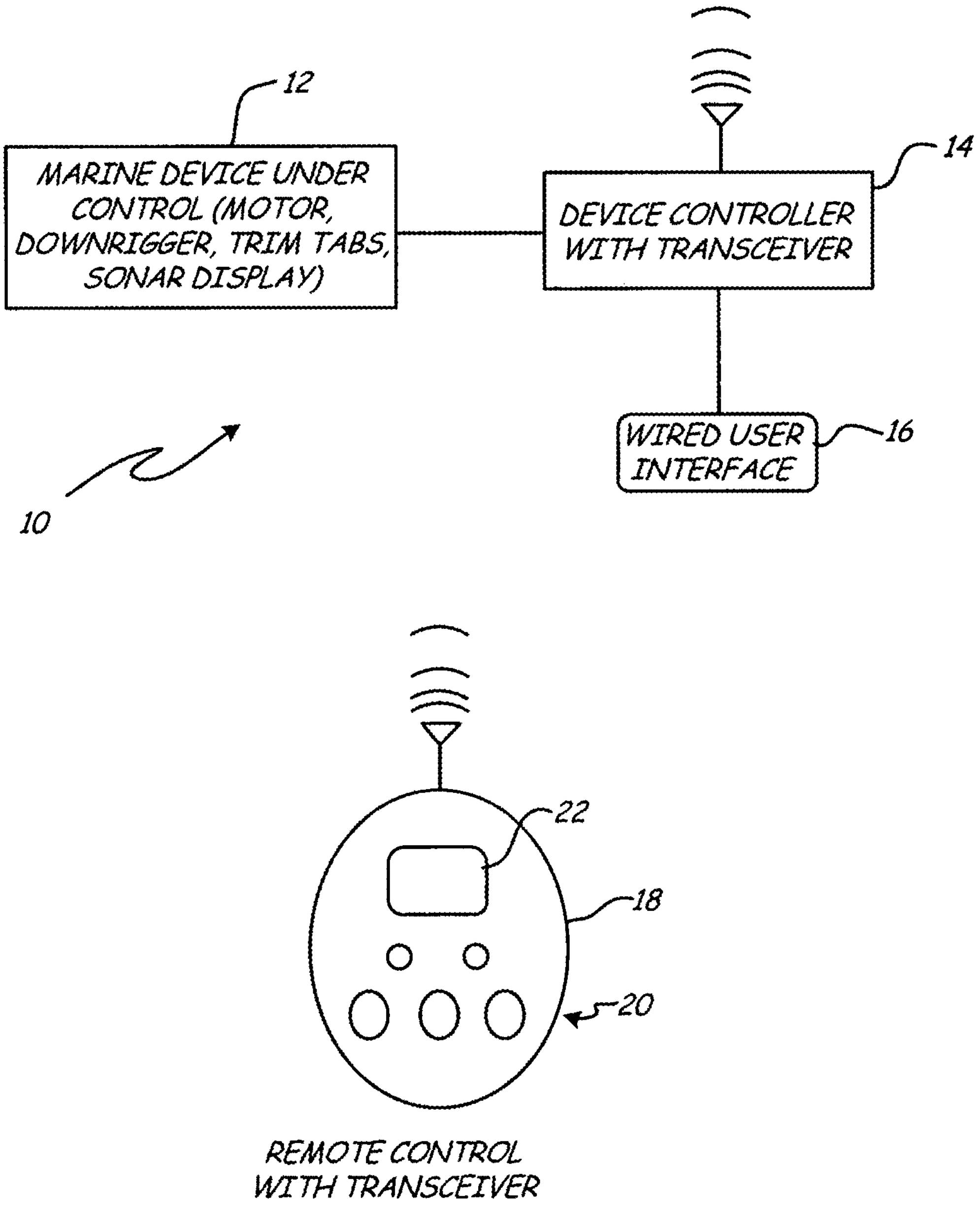
FIG. 1 is a block diagram showing the control system for a marine device in which a remote control communicates over a bidirectional wireless link with a device controller to provide commands to control the marine device and to receive device status information for real time display at the remote control.

Overview (FIG. 1)

FIG. 1 shows a block diagram of control system 10, which controls the operation of marine device 12. Control system 10 includes device controller 14, wired user interface 16, and remote control 18.

Marine device 12 may be, for example, an electric trolling motor, a downrigger system, trim tabs, or a sonar display. The trolling motor may be bow mounted, transom mounted, or mounted on a trim tab. The downrigger system includes an electric motor for raising and lowering the downrigger weight in order to position lures at selected depths. The trim tabs include electric motor driven linear actuators or hydraulic actuators for raising and lowering trim tabs mounted to the transom of the boat. The sonar display has associated ultrasonic transducers that can be operated in a number of different operating modes based upon control commands from device controller 14.

Device controller 14 is a microprocessor based controller that includes a transceiver for communicating wirelessly with remote control 18. In the embodiment shown in FIG. 1, device controller 14 also receives the input from wired user interface 16 which may be, for example, a foot pedal control or a user interface mounted on a console of the boat.

Device controller 14 connects directly with built in controls, such as motor controls, contained within marine device 12. Device controller 14 may be attached to marine device 12 or may be incorporated into the housing or a panel of marine device 12. In one embodiment, device controller 14 may connect to an input of marine device 12 configured to receive signals from wired user interface 16. In that case, device controller 14 provides control signals that simulate those normally generated by wired user interface 16.

For example, in one embodiment in which marine device 12 is a trolling motor, device controller 14 may connect to a foot pedal input plug of the trolling motor. In that case, wired user interface 16 is a foot pedal, and device controller 14 simulates signals that are normally generated by the foot pedal. In that embodiment, device controller 14 is capable of receiving inputs from both the foot pedal, as well as from remote control 18.

In other embodiments, device controller 14 may connect to marine device 12 via a dedicated serial interface. In that case, device controller 14 communicates directly with a control board on marine device 12 in order to provide control commands, and to receive operational status information from marine device 12.

Remote control 18 is a wireless device with a transceiver for communicating with device controller 14. Remote control 18 includes input buttons 20 and LCD display 22.

Input buttons 20 are used by the angler to provide input commands to marine device 12 through device controller 14. Where marine device 12 is a trolling motor, the inputs generated by input buttons 20 may provide commands to turn the propeller on or off, to increase or decrease speed, to steer the trolling motor, or to select special modes of operation.

Remote control 18 receives periodic status information from device controller 14. This status information is used to update LCD display 22. As a result, the user, who may not be in a position to observe the operation of marine device 12, can receive visual feedback of the operation of marine device 12.

In one embodiment, communication between remote control 18 and device controller 14 is provided by a wireless RF link operating at a frequency of, for example. 2.4 GHz. To ensure that remote control 18 only controls marine device 12, and not other devices on the same boat, or on nearby boats, a learn procedure may be included. Each device controller 14 may be provided a discrete serial number. During the learn procedure, remote control 18 receives and stores the serial number from device controller 14. Remote control 18 then uses that serial number in addressing device controller 14 through wireless communication. As a result, multiple remote controls can be associated with the single device controller 14, but only one device controller 14 will be associated with a particular remote control 18. In an alternative embodiment, a device controller can be associated with multiple remote controls.

Because remote control 18 is battery powered, it preferably will include power saving modes to reduce the amount of power consumed in communication with device controller 14. For example, remote control 18 and device controller 14 may be synchronized, so that remote control 18 only turns on its receiver periodically. In addition, remote control 18 may go into a standby mode after a certain period of inactivity on buttons 20. In this standby mode, the receiver of remote control 18 is turned off and will not be turned back on until activity on buttons 20 is again detected. In addition, LCD display 22 is turned off, which also saves power, during the standby mode.

Figure 2:
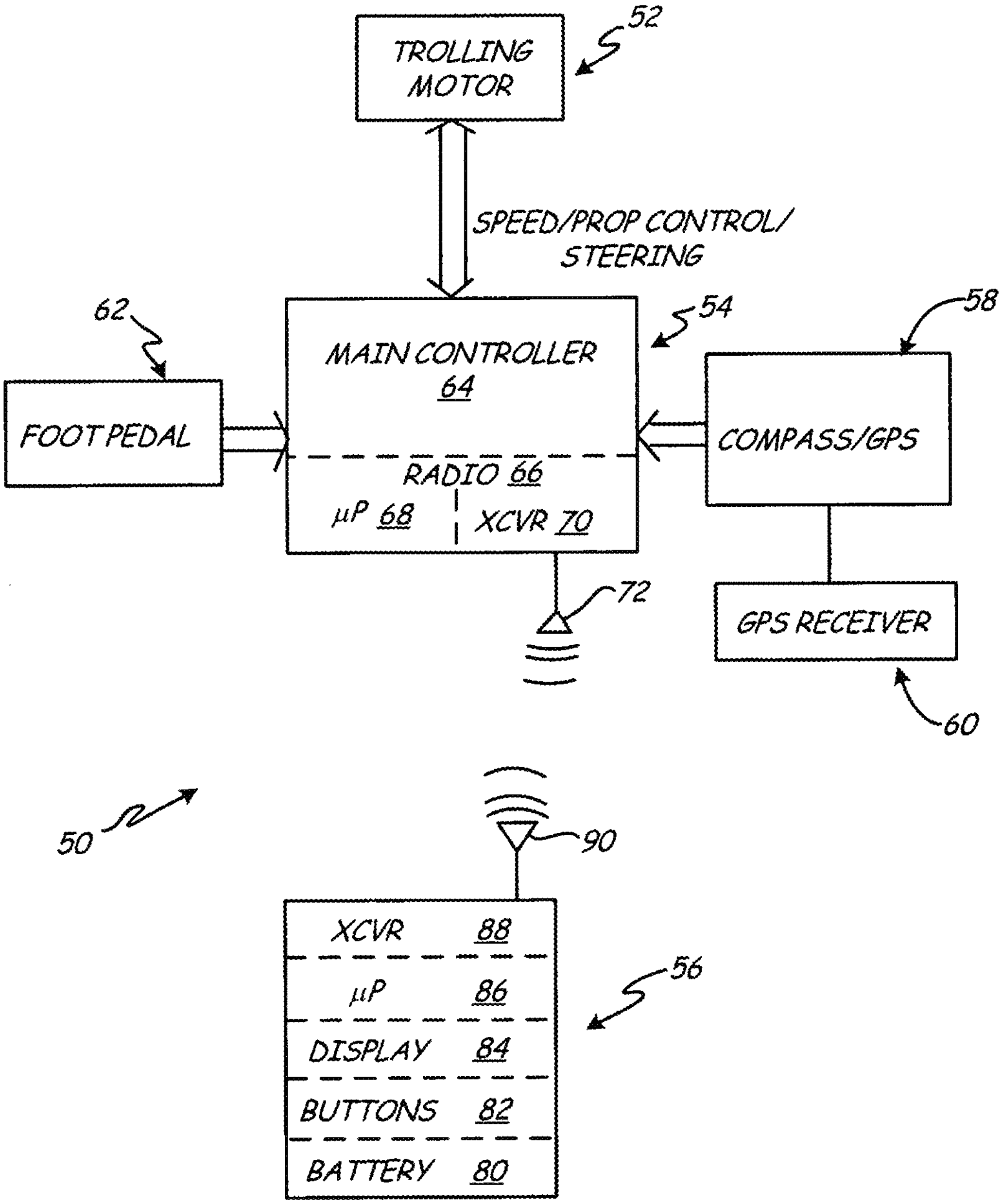
FIG. 2 is a block diagram showing a trolling motor control system having a bidirectional communication link between a remote control and a motor controller.
Figure 3:
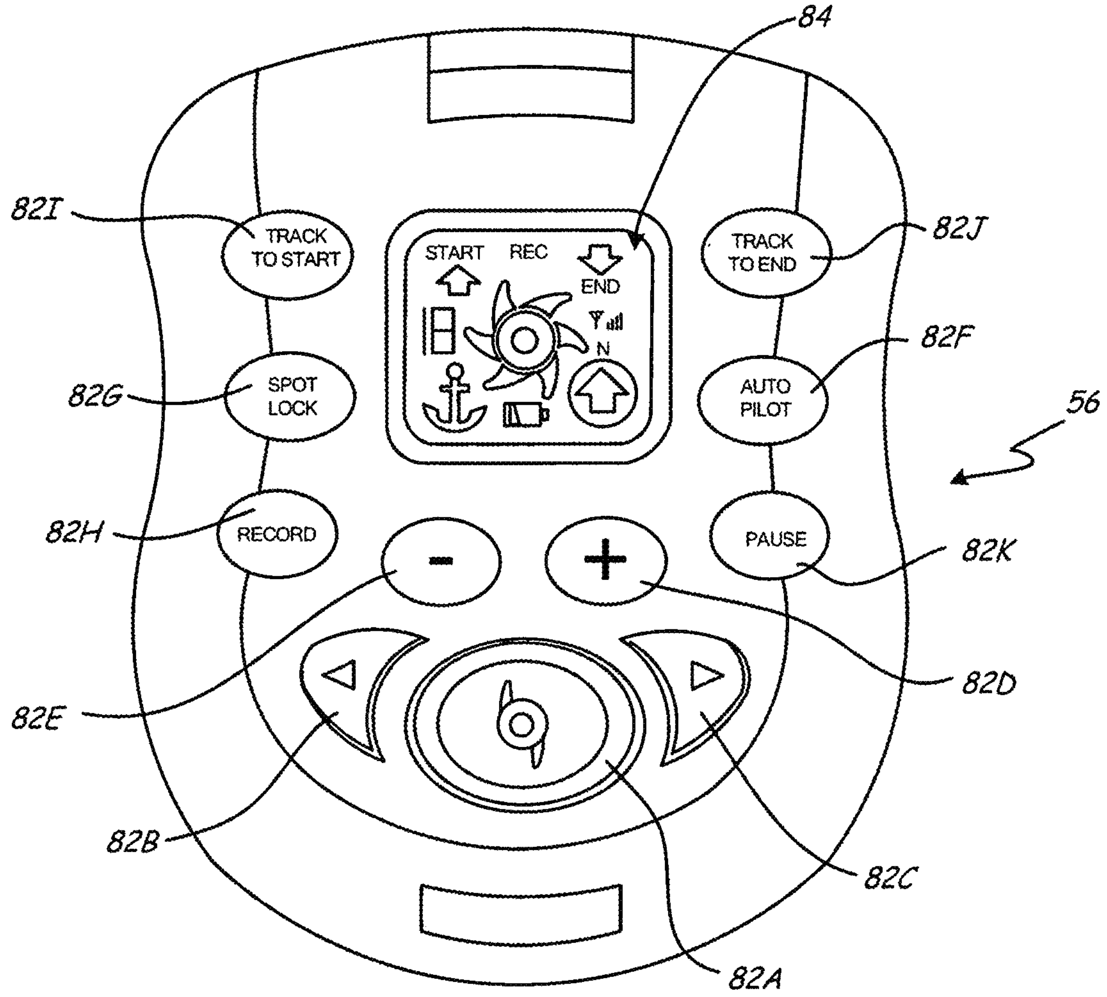
FIG. 3 is a front view of a remote control for use in the system of FIG. 2.
Figure 4:
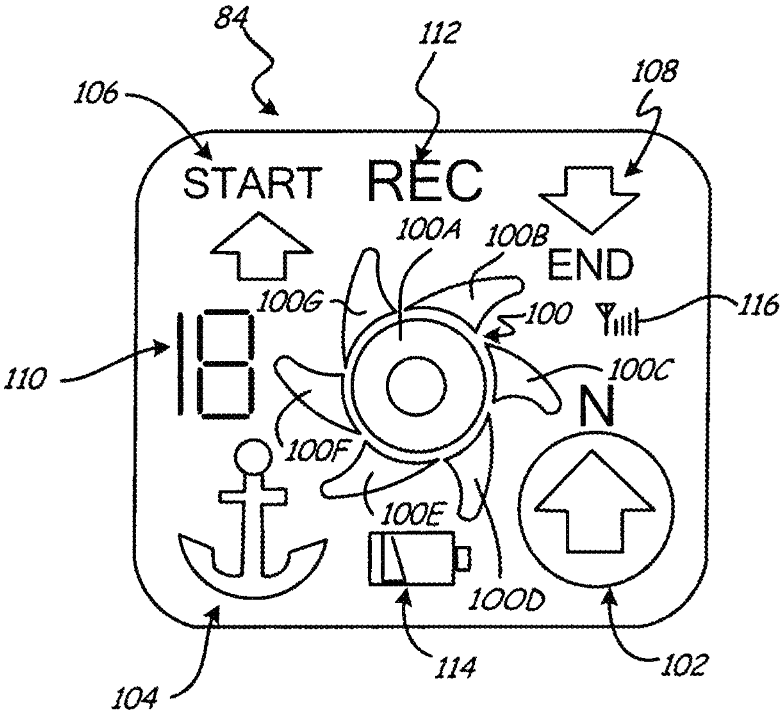
FIG. 4 is an enlarged view of the display of the remote control of FIG. 3.

Trolling Motor Autonavigation Control System (FIGS. 2-4)

FIG. 2 is a block diagram showing autonavigation control system 50, which includes trolling motor 52, controller module 54, remote control 56, compass/GPS module 58, GPS receiver 60, and foot pedal 62. Autonavigation system 50 is capable of automatically navigating a boat through the use of GPS-based technology.

Trolling motor 52 is a bow mounted electric trolling motor that includes a thrust motor with its position below the surface of the water to provide thrust to move the boat. Trolling motor 52 also includes a steering control motor to control the orientation of the thrust motor to provide steering.

Controller module 54 controls the main motor functions (steering, speed, and propeller on/off) of trolling motor 52 based upon inputs from remote control 56, foot pedal 62, and compass module 58. Controller module 54 includes two main functional areas, main controller section 64 and radio section 66. Main controller section 64 is a microprocessor based controller that is connected to the motor control board of trolling motor 52 to provide propeller on/off, speed, and steering control commands. Main controller section 64 also receives and processes input signals from foot pedal 62 which include steer left, steer right, momentary/continuous and motor speed inputs. Main controller section 64 also receives data from compass/GPS module 58 that represents both a compass reading and GPS position data. The inputs from compass/GPS module 58 are used by main controller 64 when system 50 is operating is operating in one of several autonavigation modes.

Radio section 66 of controller module 54 includes microprocessor 68, transceiver 70, and antenna 72. Radio section 66 provides bidirectional communication between remote control 56 and main controller section 64 of controller module 54.

Microprocessor 68 interacts with remote control 56 via transceiver 70. Microprocessor 68 controls transceiver 70 for sending periodic status packets to remote control 56. Microprocessor 68 also controls transceiver 70 for receiving button commands from remote control 56. This includes determining if a packet received by transceiver 70 came from an associated remote control.

Commands received from remote control 56 through transceiver 70 of radio section 66 are passed on to the microprocessor of main controller section 64. A protocol for communication between main controller section 64 and radio section 66 may use, for example, a UART communications protocol.

Commands received from remote control 56 are treated as requests. Main controller 64 must determine whether the request can be processed based on priorities from other inputs (such as inputs from compass/GPS module 58 and foot pedal 62).

Microprocessor 68 also receives status information from main controller 64. This status information is then sent through transceiver 70 to remote control 56, where it can be displayed to provide a visual indication to the user of the current operating status of autonavigation system 50.

Another function of microprocessor 68 of radio section 66 is handling the learn function with remote control 56. As discussed previously, during the learn function the unique serial number of control module 54 is provided to remote control 56, so that it can be used during communications to associate remote control 56 with control module 54. In that way, RF signals from remote control 56 identify the control module to which they are directed, so that remote control 56 does not erroneously cause operation of another nearby system.

Main controller section 64 interacts with compass module 58 by periodically polling compass module 58 for current data. Included in this data will be the current compass heading and GPS receiver data. This data is used for various autonavigation functions. In this interaction with compass module 58, the microprocessor of main controller 64 is considered the master and the microprocessor in compass module 58 is considered a slave.

Main controller 64 also receives and processes command requests from the RF microprocessor 68. Main controller 64 must be able to detect and receive an incoming command request, process it, and send back updated status information to microprocessor 68 as quickly as possible (typically on an order of one millisecond)

Main controller 64 also interacts with foot pedal 62. In one embodiment, main controller 64 reads discrete digital and analog signals from foot petal 62, and determines whether the request made by foot pedal 62 can be processed based on priorities from other inputs. The discrete digital and analog signals can include the state of left and right steering switches, an analog input from a speed potentiometer, and the state of momentary and continuous switches on the foot pedal. In other embodiments, in which foot pedal 62 communicates by only digital signals, main controller 64 derives foot pedal status from serial digital data.

Remote control 56 is the main user interface for autonavigation system 50. Remote control 56 includes battery 80, input buttons 82. LCD display 84, microprocessor 86, transceiver 88, and antenna 90.

Buttons 82 allow the user to control basic functions of trolling motor 52 such as speed, steering and propeller on/off. In addition, buttons 82 allow the user to activate autonavigation functions.

LCD display 84 provides feedback to the user in the operational state of control system 50 and trolling motor 52. LCD display 84 has a number of different icons representing different aspects of the operation of control system 50 and trolling motor 52, which are activated based upon status packets received from control module 54.

As buttons 82 on remote control 56 are pressed, commands are transmitted by remote control 56 to control module 54. Status information is received by remote control 56 from control module 54. The status information is used by remote control 56 to determine which icons on LCD display 84 are activated Microprocessor 86 receives inputs from buttons 82 and provides display control signals to LCD display 84. Microprocessor 86 also interacts with transceiver 88 to control the transmission of commands and the receiving of status packets.

Microprocessor 86 scans the status of buttons 82. It detects and decodes button presses and sends appropriate data packets to transceiver 88 based upon the detected button presses. Microprocessor 86 controls transceiver 88 to send button commands through antenna 90 to controller module 54.

Communication between remote control 56 and controller module 54 is synchronized in order to save battery power. Microprocessor 86 synchronizes the communication by controlling when the receiver of transceiver 88 is turned on to receive periodic status packets. Microprocessor 86 receives and decodes status packets that have been received from controller module 54 by transceiver 88. This includes determining whether the packet came from the controller module with which remote control 56 is associated.

Microprocessor 86 also monitors the condition of battery 80. When appropriate, microprocessor 86 activates low battery icon on LCD display 84.

Remote control 56 has three main modes of operation: off line, on line/communicating, and on line/standby. During the off line mode, remote control 56 is not currently synchronized with controller module 54. LCD display 84 is turned off. Microprocessor 86 is in a sleep state, and will only come out of its sleep state when one of buttons 82 is pressed. When a button press is detected, microprocessor 86 will go to on line/communicating mode if it receives a valid status update from controller module 54 within a specified amount of time. If no status update is received, microprocessor 86 will go back to the off line mode.

In the on line/communicating mode, remote control 56 is currently synchronized with controller module 54. LCD display 84 is being actively updated, and microprocessor 86 is awake to receive and transmit data. As soon as microprocessor 86 finishes communications, it goes back to the on line/standby mode. Remote control 56 goes to the off line mode if a predetermined period of time has gone by without a valid status update from controller module 54.

During the on line/standby mode, remote control 56 is currently synchronized from controller module 54. LCD display 84 is being actively updated during on line/standby mode. Microprocessor 86 wakes up only to receive status updates. This wake up time can occur, for example, every 100 milliseconds. If a button is pressed while remote control 56 is in on line/standby mode, it will then go into on line/communicating mode. Remote control 56 will go into the off line mode after a time out period (for example 3 seconds) has gone by without a valid status input from controller module 56.

Controller module 54 periodically sends out status packets to all remote controls that are on line. The status packets include information such as operating mode, propeller speed, whether the propeller is on, etc. Remote control 56 must become synchronized with the timing of the status packets from controller module 54, so that remote control 56 knows when to wake up and turn on the receiver of transceiver 88. In one embodiment, the cycle time period between status packets is about 100 milliseconds, but will vary slightly in order to help alleviate the possibility of two adjacent systems continuously having their status packets collide.

In between status packets, remote control 56 will maintain a 10 millisecond interrupt. The time between interrupts is referred to as a window. When one of buttons 82 on remote control 56 is pressed, remote control 56 will transmit a packet of button press information during the next 10 millisecond window. Remote control 56 then expects to receive updated status information from controller module 54 before the end of the same 10 millisecond window FIG. 3 is a front view of remote control 56 showing buttons 82A-82K and LCD display 84. Buttons 82A-82E are basic control buttons used during normal operating mode system 50, in which no autonavigation functions are enabled. Button 82A controls propeller on and off. Steer left button 82B and steer right button 82C provide steering commands. Speed up button 82D and speed down button 82E provide speed control commands to increase or decrease the speed of the trolling motor's lower unit.

Buttons 82F through 82K are used to enable and disable special autonavigation functions. Pressing and releasing autopilot button 82F will enable or disable the Autopilot mode. When Autopilot mode is enabled, any other autonavigation function that has previously been enabled is automatically disabled.

The desired heading to be used during Autopilot mode is locked in when autopilot button 82F is pushed to enable the Autopilot mode. In response to button 82F being pushed, compass heading data from compass module 58 is immediately acquired by main controller 64 of controller module 54. The desired heading can be changed while in the Autopilot mode by manually controlling steering through buttons 82B, 82C or through foot pedal 62. The new desired heading is locked in when the user stops manually steering while the Autopilot mode is enabled. Once manual steering stops and does not resume for a waiting period, a new desired heading based on the current compass heading data from compass module 58 is locked in. Control module 54 uses heading data from compass module 58 during the Autopilot mode to make corrections to the steering in order to keep trolling motor 52 pointing at the desired heading.

Pressing spot lock button 82G will enable or disable a Spot Lock mode, which also may be referred to as electronic anchoring. When the Spot Lock mode is enabled, any other autonavigation function that has previously been enabled is automatically disabled. When the Spot Lock mode is enabled, controller module 54 locks on the current GPS position, as received from compass module 58.

The user manually navigates the boat to a desired location prior to activating spot lock button 82G. Once the Spot Lock mode is enabled, controller module 54 uses data from GPS receiver 60 through compass module 58 to control trolling motor 52 so that the boat is maintained in the current GPS position. While system 50 is in the Spot Lock mode, pressing any of autonavigation buttons 82F-82J will disable the Spot Lock mode.

While in Spot Lock mode, pressing pause button 82K or any one of buttons 82A-82E will cause controller module 54 to go into Spot Lock Pause mode. This allows the user to temporarily move the boat and yet not lose the original locked on position. The propeller is automatically turned off when switching to Spot Lock Pause mode. Pressing pause button 82K again will re-enable the Spot Lock mode using the original locked-on position. Pressing spot lock button 82G while in the Spot Lock Pause mode will cause the Spot Lock mode to be disabled.

Record button 82H allows the user to select a Record Track mode. This function allows the user to record a particular track as the user manually navigates the boat through that track. The recorded track data is used for Track To Start and Track To End modes. Examples of tracks that may be recorded are a particular shoreline, a line of underwater terrain, or another productive fishing run that the user wishes to duplicate.

To begin the Record Track mode, the user presses record button 82H. While recording a track, if record button 82H or another autonavigation button 82F. 82G, 82I 82J, or 82K is pressed, the button press marks the end of the current track being recorded. All other autonavigation functions are disabled during the Record Track mode.

While in Record Track mode, controller 54 stores in memory GPS track way-points based upon data from compass module 58. The GPS track waypoints are periodically recorded based on distance or based upon elapsed time.

Pressing track to start button 82I on remote control 56 enables the Track To Start mode. All other autonavigation functions are disabled automatically when the track to start mode is enabled. In the Track To Start mode, controller module 54 controls trolling motor 52 to navigate the boat through the previously recorded track toward the first recorded waypoint. In other words, the track is followed in the reverse order in which the waypoints were recorded. When the boat arrives at the first waypoint in the track, as indicated by GPS data from GPS receiver 60 and compass module 58, controller module 54 automatically turns off trolling motor 52 and disables the Track To Start mode.

When the Track To Start mode is enabled, controller 54 selects the nearest waypoint in the recorded track as a starting point. The user must set the appropriate speed, using either buttons 82D and 82E, or using foot pedal 62.

The Track To Start mode will be disabled by pressing any of buttons 82F-82J In addition, the Track To Start mode can be paused by pressing pause button 82K, left steer button 82B, right steer button 82C, or prop on/off button 82A. The Track To Start Pause mode allows the user to temporarily move the boat for various reasons, such as navigating around a new obstruction, or unsnagging a fishing lure. Pressing pause button 82K while in the Track To Start Pause mode will cause controller module 54 to re-enable the Track To Start mode. When coming out of the Track To Start Pause mode, system 50 will resume following the recorded track by rejoining at the nearest recorded waypoint. Pressing Track To Start button 82I while in the Track To Start Pause mode causes controller module 54 to revert to the Normal mode, with no automatic navigation.

Track To End button 82J on remote control 56 is pressed to enable the Track To End mode. When the Track To End mode is enabled, all other autonavigation functions are automatically disabled by controller module 54.

When the Track To End mode is enabled, controller module 54 controls trolling motor 52 to navigate the boat through the previously recorded track toward the direction of the last recorded waypoint. In other words, the track is followed in the order that waypoints were recorded. The Track To End mode will start with the nearest recorded waypoint as the starting point, and will continue toward the last recorded waypoint. When the boat arrives at the last waypoint in the track, controller module 54 turns off trolling motor 52 and disables the Track To End mode.

Like to Track To Start mode, the Track To End mode can be disabled by pressing autonavigation buttons 82F-82J and can be paused by pressing pause button 82K, steering buttons 82B, 82C, or propeller on/off button 82A. Pressing pause button 82K while the Track To End Pause mode will cause controller 54 to resume the Track To End mode operation. Pressing track to end button 82J while in the Track to End Pause mode causes controller 54 to revert to the Normal mode.

FIG. 4 shows LCD display 84, which includes status icons to provide visual feedback to the user of the operation of system 50. The status icons include propeller icon 100, autopilot icon 102, spot lock icon 104, track to start icon 106, track to end icon 108, speed icon 110, record icon 112. GPS signal quality icon 114 and low battery icon 116. LCD display 84 can be implemented using fixed icons or may be a pixilated display. In the pixilated embodiments, the screen of LCD display 84 is populated with an array of pixels that are configurable into any pattern including icons and text.

Propeller icon 100 is a depiction of a propeller, and includes central hub segment 100 a and propeller segments 100B-100G. Propeller icon 100 appears to be stationery when the propeller trolling motor 52 is not turning. Propeller icon 100 appears to be rotating when the propeller of trolling motor 52 is turning. The appearance of rotation is provided by turning on and off propeller blade segments 100B-100G of icon 100 to provide the appearance that propeller icon 100 is rotating.

Autopilot icon 102 depicts a direction arrow within a circle. When the Autopilot mode is enabled, autopilot icon 102 is turned on.

Spot lock icon 104 is in the shape of an anchor. When system 50 is in the Spot Lock mode, spot lock icon 104 is turned on. Spot lock icon 104 will flash while system 50 is in the Spot Lock Pause mode.

Track to start icon 106 includes an arrow pointing to the word "start." When system 50 is in the Track To Start mode, track to start icon 106 is turned on. Track to start icon 106 will flash while system 50 is in the Track To Start Pause mode.

Track to end icon 108 is an arrow pointing at the word "end." When system 50 is in the Track To End mode, track to end icon 108 is turned on. Track to end icon 108 will flash while system 50 is in the Track To End Pause mode.

Speed icon 110 is a two digit display capable of displaying motor speed settings from zero to ten. The displayed motor speed setting may be as a result of control inputs from speed buttons 82D and 82E of remote control 56, or speed commands received by controller module 54 from foot pedal 62. Speed icon 110 is active whenever remote control 56 is active and display 84 is turned on.

Record icon 112 forms the letters "rec." While a track is being recorded in the Record Track mode, record icon 112 is turned on. If the user attempts to enable either the Track To End mode or the Track To Start mode and there is no recorded track, record icon 112 will flash. In addition, audio feedback may also be provided if remote control 56 includes an audio transducer such as a buzzer of a beeper.

GPS signal quality icon 114 includes four vertical bars that are used to indicate an approximate level of signal quality. No bars indicate an unusable signal or no signal, one bar indicates a poor signal, two bars indicate a moderate signal, three bars indicate a good signal and four bars indicate an excellent signal.

One important factor in systems that rely on the GPS system is the quality of the signal being received from the satellites. The signal quality is a quantitative value that is determined by the GPS receiver itself. Factors used in determining the signal quality include: (1) the number of satellites in view, (2) the relative angle of the satellites in view, and (3) the presence of correction signals such as WAAS.

A system using GPS can use the signal quality value to help determine whether there is sufficient accuracy to perform a given function or the signal quality value can also be indicated to the user of the system to allow user to make that determination. Another reason to indicate the signal quality value to the user is to alert the user to the fact that the signal quality is being reduced due to some blockage between the GPS receiver and the sky and that the user may want to rectify the situation.

Icons 100-114 are all based upon status update packets received by remote control 56 from controller module 54. Low battery icon 116, on the other hand, is controlled based upon monitoring of remote control battery 80 by microprocessor 86. Low battery icon 116 depicts a battery with a low state of charge.

In one embodiment, the status information to be transmitted to remote control 56 is communicated from the microprocessor of main controller 64 to radio microprocessor 68 in the form of two 8 bit bytes. These two bytes can then be used to form the message packet sent by transceiver 70 of controller module 54 to transceiver 88 of remote control 56. The status bytes may include a 4 bit nibble that indicates the status of all autonavigation modes: Normal, Track To Start, Track To Start Pause, Track To End, Track To End Pause, Spot Lock, Sport Lock Pause. Autopilot, Autopilot Pause, Record Track, and Record Track Pause. Icons 102, 104, 106, 108, and 112 are controlled based upon the autonavigation command nibble. A 4 bit speed command nibble is used to provide eleven different speed setting values from zero to ten. The speed setting value may be determined by main controller 64 based upon an input from foot pedal 62, or may be based upon control inputs produced by remote control 56 using speed control buttons 82D and 82E.

Upon power up, main controller 64 monitors inputs from foot pedal 62, and generates a number from zero to ten that best represents the setting on foot pedal 62. That number is loaded into the speed command nibble. As the speed control signal from foot pedal 62 changes, main controller 64 will also change the speed command nibble so that speed icon 110 on LCD display 84 of remote control 56 is updated to represent the current setting of foot pedal 62. When the angler changes speed using speed up button 82D or speed down button 82E on remote control 56, main controller 64 puts foot pedal 62 into a standby mode until the foot pedal speed control is moved or another foot pedal function is activated. While foot pedal 62 is in standby, the user is in control of the propeller speed setting through use of buttons 82D and 82E on remote control 56.

The status bytes also include individual bits indicating status of system 50 and trolling motor 52. A prop on/off bit in one of the status bytes indicates whether the propeller of trolling motor 52 is turned on or turned off. This prop on/off bit is used by microprocessor 86 of remote control 56 to control propeller icon 100 of display 84. Status bits also provide the data to control GPS signal quality icon 114.

One additional status bit that may be included is a busy bit that indicates that main controller 64 is not accepting commands from remote control 56. The busy condition occurs, for example, when foot pedal 62 is being used to control trolling motor 52.

Another status bit that may be included is a remote control steering active bit. This bit is set by main controller 64 whenever remote control 56 is providing steering commands. The bit is cleared whenever remote control 56 stops steering, or if foot pedal 62 takes control and provides steering inputs to main controller 64.

With the bidirectional communication between controller module 54 and remote control 56 that includes status information to control display 84, the user is provided visual feedback of the operating status of control system 50 and trolling motor 54. This makes remote control operation of trolling motor 54 more effective and more intuitive to the user.

Trim Tab/Trolling Motor System (FIGS. 5-8)

Figure 5:
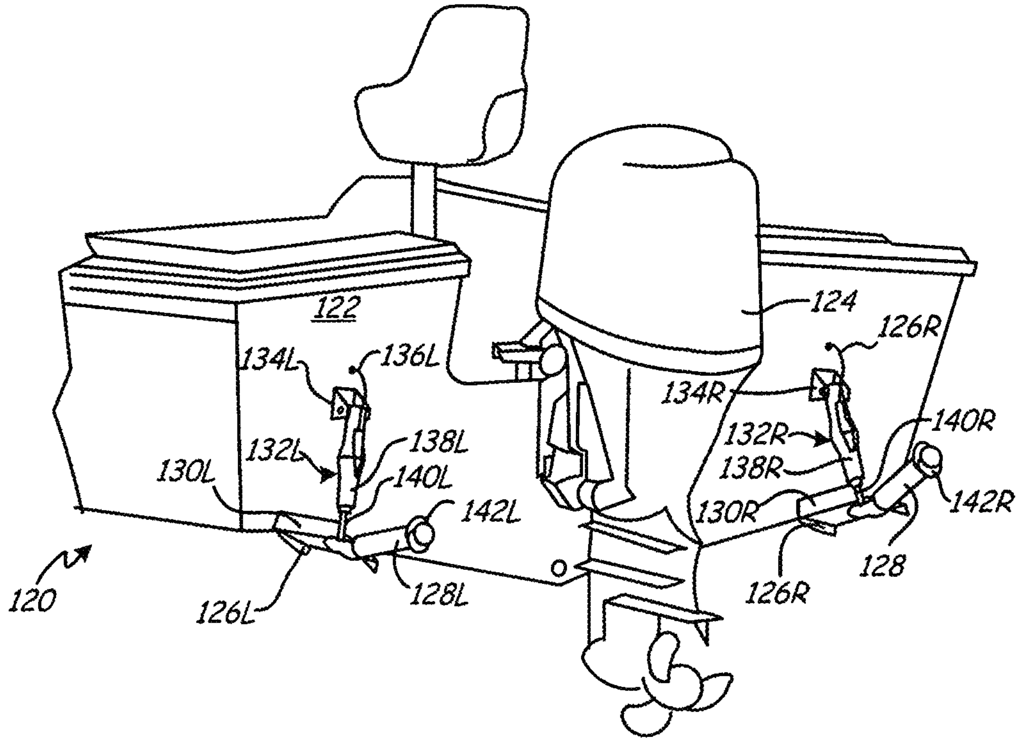
FIG. 5 is a perspective view of a stern of a boat with electric trolling motors mounted on trim tabs.

FIG. 5 shows the stern of boat 120 having a trim tab/trolling motor system. Mounted on transom 122 is outboard motor 124 and trim tabs 126L and 126R. Left or port trolling motor 128L is carried by left trim tab 126L, and right or starboard trolling motor 128R is carried by right trim tab 126R. Hinges 130L and 130R pivotally connect trim tab 126L and 126R, respectively, to transom 122. Linear actuators 132L and 132R are connected between brackets 134L, 134R on transom 122 and trim tabs 126L and 126R, respectively. The angle of each trim tab 126L, 126R is determined by the amount of extension of actuators 132L and 132R, respectively. Actuators 132L and 132R are, in one embodiment, electromechanical actuators that receive electrical power and provide feedback signals through cables 136L, 136R. Actuator 132L includes actuator housing 138L and actuator rod 140L; and actuator 132R includes actuator housing 138R and actuator rod 140R.

Trim tabs 126L and 126R operate in a trim range from about 0° (horizontal) to about 20° below horizontal. Trim tabs 126L and 126R can be individually adjusted within the trim range, or can be adjusted together by equal amounts.

When trolling is desired, trim tabs 126L and 126R are moved to a troll range, which is below the trim range. The troll range may be, for example, between about 20° to 30° below horizontal. Trim tabs 126L and 126R are moved together to the same angle within the troll range, so that both trolling motors 128L and 128R are at the same elevation. During trolling, trolling motors 128L and 128R are electrically driven so that their propellers 142L and 142R rotate. The relative speed and direction of rotation of propellers 142L and 142R can be controlled to achieve movement of boat 120 forward or in reverse and to achieve steering to the left or right.

Figure 6:
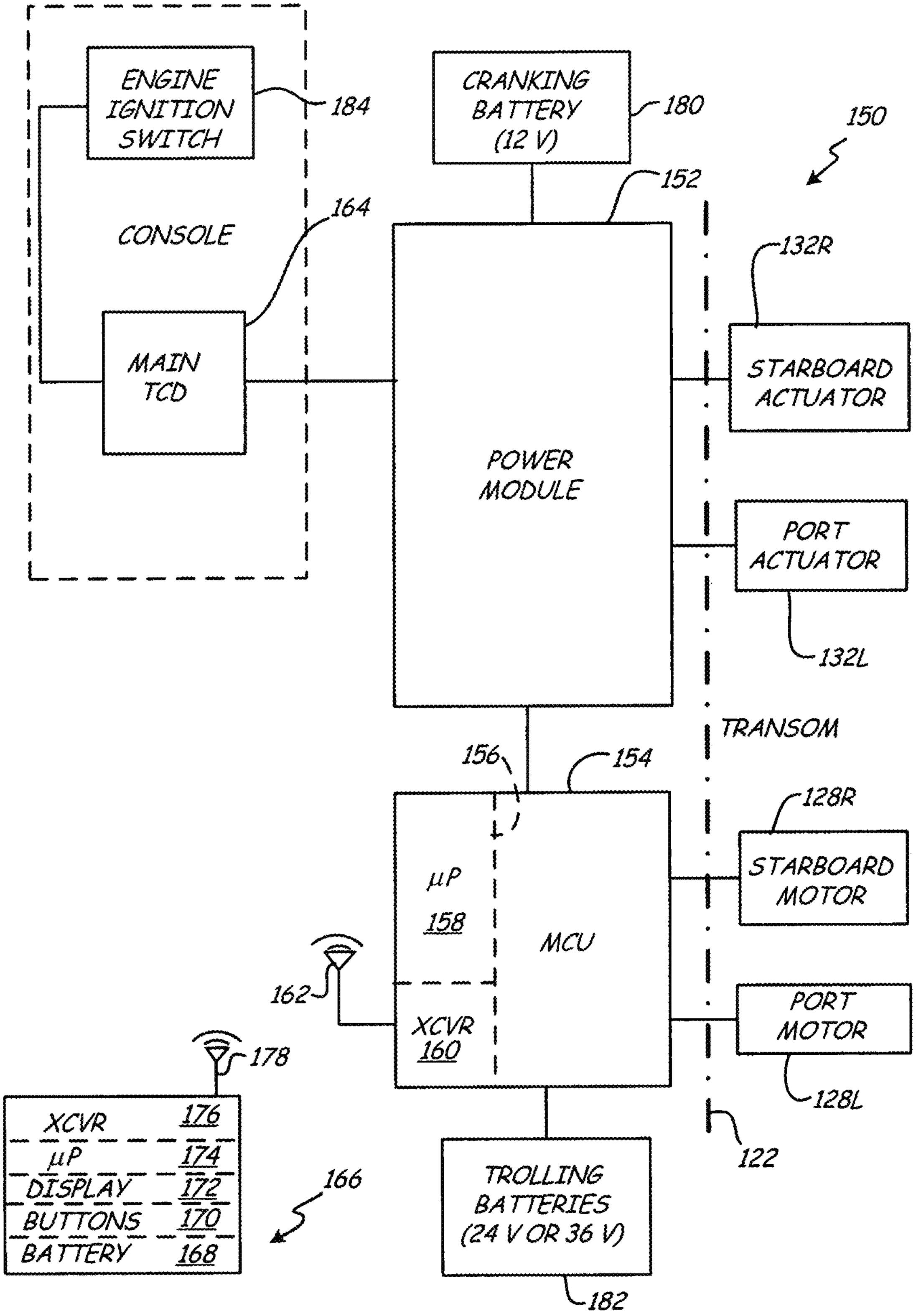
FIG. 6 is a block diagram of the control system for operating the trim tabs and electric trolling motors.

FIG. 6 is a block diagram showing control system 150, which controls the position of trim tab 126L and 126R (FIG. 5) and the operation of motors 128L and 128R. Control system 150 includes motors 128L and 128R, actuators 132L and 132R, power module 152, motor control unit (MCU) 154 (which includes radio 156 with microprocessor 158, transceiver 160 and antenna 162), tab control display (TCD) 164 and remote control 166 (which includes battery 168, buttons 170, display 172, microprocessor 174, transceiver 176, and antenna 178). Also shown in FIG. 6 are cranking battery 180 and trolling batteries 182, and main engine ignition switch 184.

Power module 152 is a microprocessor based controller that controls the operation of actuators 132L and 132R to position tabs 126L and 126R, respectively. Power module 152 receives input commands from tab control display 164 and motor control unit 154. The electrical power required to operate actuators 132L and 132R is provided to power module 152 by cranking battery 180. Power module 152 drives actuators 132L and 132R as a function of the input commands. Actuators 132L, 132R each include an electric actuator motor (not shown) that drives actuator rod 140L, 140R (FIG. 5) through a gearbox and an acme screw. Actuator rods 140L, 140R move linearly out of or into actuator housings 138L. 138R, respectively as rods 140L, 140R are driven by the actuator motors. A magnet on the motor shaft and a magnetic sensor, such as a reed switch, within each actuator 132L, 132R, produce tachometer signal pulses. In addition, a limit switch in each actuator 132L, 132R senses when actuator rod 140L, 140R reaches an upper limit position, which corresponds to the fully retracted position of the trim tab.

Power module 152 receives as feedback the tachometer signal and the upper limit signal from each actuator 132L, 132R. From the feedback signals, power module 152 can determine the extension of each actuator 132L, 132R, and thus the positions of tabs 126L and 126R.

Power module 152 maintains a tab position count for each trim tab 126L, 126R, which power module 152 increments or decrements with each tachometer pulse, depending on the direction of rotation of the actuator motor. Power module 152 controls the operation of the actuator motors, and thus knows the direction of rotation of each actuator motor. The tab position count is based upon the number of tachometer signal pulses received and their direction since the last time the upper limit switch was closed. The fully retracted position defined by the upper limit switch is a reference point for the tab position count, which is synchronized each time the upper limit switch is closed. The positions of tabs 126L and 126R, based on the counts maintained by power module 152, are displayed on tab control display 164.

During a "learn function" initiated by simultaneous pressing of two or more buttons on tab control display 164, power module 152 drives actuators 132L, 132R to the fully extended end-of-stroke position. Power module 152 then drives actuators 132L, 132R until the upper limit switches signal that the fully retracted position is reached. Power module 152 counts the number of tachometer pulses between the two positions. From that count, power module 152 identifies whether actuators 132L, 132R are long, medium or short stroke actuators, and determines how many pulses correspond to one light emitting diode (LED) increment on tab control display 164.

Power module 152 also periodically stores the current tab position counts in non-volatile memory. The last stored tab positions at system power down are recalled upon system power up, and tab position indicating LEDs on tab control display 164 are updated based on the recalled values. As a result, control system 150 does not require that tabs 126L and 126R start in the fully retracted position upon power up or be driven to the fully retracted position before operation can start.

Motor control unit 154 is capable of independently controlling the speed and rotation direction of each motor 128L and 128R. Motor control unit 154 is a microprocessor based controller that contains motor drive circuitry for driving each motor 128L, 128R. Motor control unit 154 also includes radio 156 to take commands from and provide status information to remote control 164. Motor control unit 154 communicates with power module 152 via a cable connection to receive input commands supplied by tab control display 164.

Tab control display 164 is a user interface for controlling tab position while tabs 126L, 126R are in the trim range (from the fully retracted position to approximately 20° down). LEDs on tab control display 164 indicate the positions of tabs 126L and 126R in the trim range, as well as in the troll range (from approximately 20° to full down). Tab control display 164 also receives as an input the state of engine ignition switch 184. The state of ignition switch 184 is provided, along with other input commands, to power module 152. Although one tab control display 164 is shown in FIG. 6, control system 150 can include multiple tab control displays of different locations on the boat. Some or all of the tab control displays can communicate with power module 152 and motor control unit 154 via a bidirectional communication link in the same manner as remote control 166.

Remote control 166 is used to issue commands to motor control unit 154 for controlling the operation of trolling motors 128L, and 128R. These command functions include turning the propellers on and off, controlling propeller speed, controlling propeller direction, and steering (left, right, and return-to-center). Remote control 166 also provides commands used by power module 152 to move tabs 126L and 126R into the troll range and to adjust them within the troll range. Commands from remote control 166 to control the tabs are provided by motor control unit 154 to power module 152. Although one remote control 166 is shown, control system 150 can include multiple remote controls.

Figure 7:
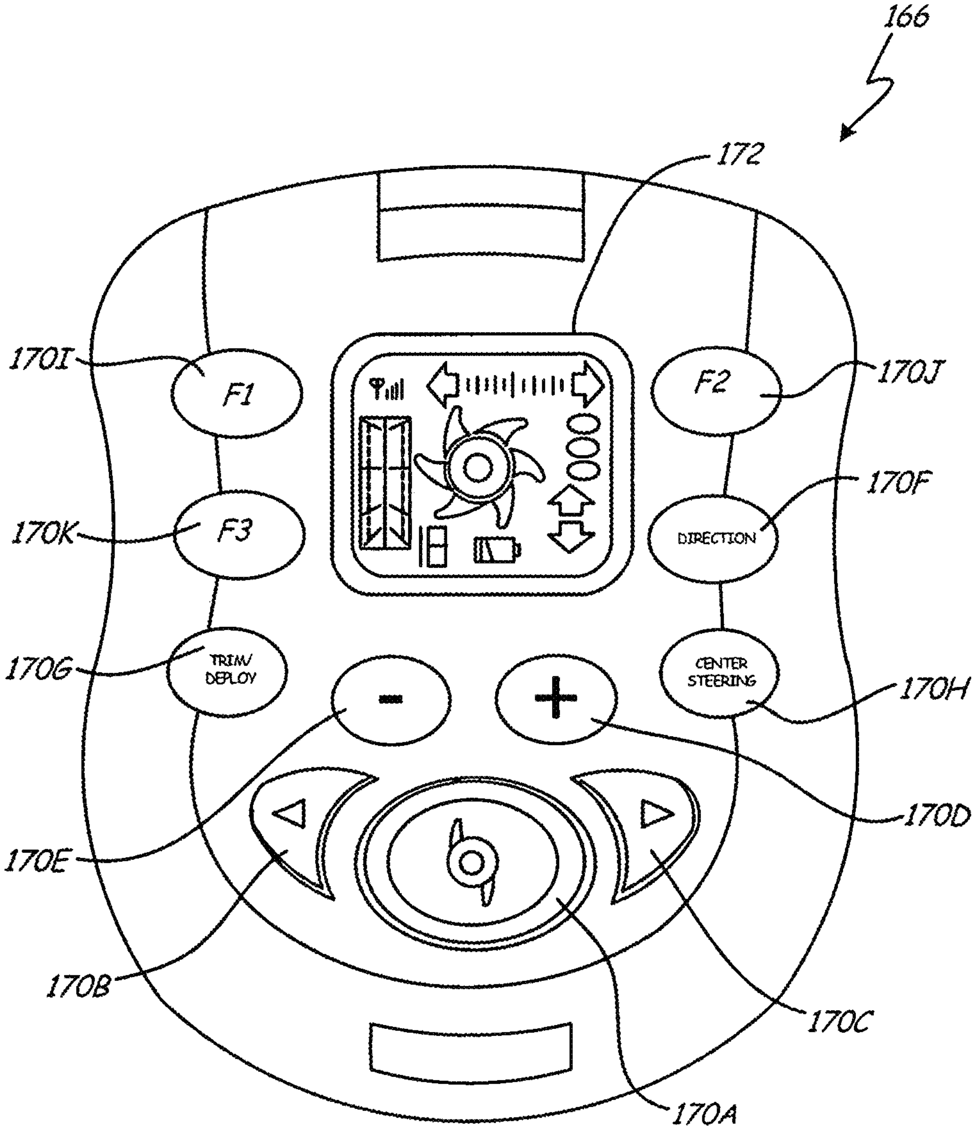
FIG. 7 shows a remote control for providing commands to control operation of the trim tabs and trolling motors.

FIG. 7 shows remote control 166, which is a small, handheld, battery powered device that provides commands to motor control unit 154 and power module 152 by RF signals. Remote control 166 includes an RF transceiver 176 and built in antenna 178 for communicating with antenna 162 and RF transceiver 160 of motor control unit 154.

Remote control 166 includes prop on/off switch 170A, steer left switch 170B, steer right switch 170C, speed up switch 170D, speed down switch 170E, forward/reverse direction switch 170F, trim/deploy switch 170G, and center steering switch 170H, special function switches 1701-170K, and display 172.

With prop on/off switch 170A, remote control 166 can turn both motors 128L and 128R on and off. With both motors on, the operator can decrease or increase speed of both motors with speed up switch 170D and speed down switch 170E, and can determine the direction of rotation of both propellers with forward/reverse direction switch 170F.

Deploying trim tabs 126L and 126R (and motors 128L and 128R) to the troll range, and raising and lowering them within the troll range, is controlled through trim/deploy switch 170G of remote control 166. When trim tabs 126L and 126R are in the trim range, pressing trim/deploy switch 170G will cause trim tabs 126L and 126R to move to the bottom end of the troll range. Once in the troll range, trim tabs 126L and 126R move as long as trim/deploy switch 170G is held down. Movement of trim tabs 126L and 126R changes direction each time switch 170G is released and then pressed again. To move trim tabs 126L and 126R out of the troll range, either tab control display 164 is used, or ignition switch 184 is turned on.

Steering is controlled using steer left switch 170B and steer right switch 170C. Since motors 128L and 128R are rigidly mounted to trim tabs 126L and 126R, steering is achieved by controlling the speed and the direction of rotation of each motor independently, rather than by rotating motors 128L and 128R to the left and right. Motor control unit 154, under the control of remote control 166, can control the motor speed and the direction of propeller rotation of each motor 128L. 128R to provide the desired steering.

When a steer left command is received, motor control unit 154 will increase the speed of motor 128R and decrease the speed of motor 128L from the current speed setting, which was based on commands from speed up and speed down switches 170D and 170E. Similarly, when a steer right command is received, motor control unit 154 will increase the speed of motor 128L and decrease the speed of motor 128R from their current speed setting. The longer that steer left switch 170B or steer right switch 170C is held, the greater the relative difference in thrust from motors 128L and 128R and the sharper the turn. When a very sharp turn is commanded, one of the motors 128L. 128R may have its speed reduced to zero and then increased with its propeller rotated in an opposite direction. In that case, propellers 134L and 134R may be rotating in opposite directions to obtain the needed difference in thrust.

Remote control 166 and motor control unit 154 provide a Return-to-Center feature that allows the operator to return the steering to neutral when the desired heading has been achieved. Center steering switch 170H provides a return-to-center command to motor control unit 154 to cause both motors 128L and 128R to be driven at the same speed and in the same direction. The speed will be that which was previously set by the operator using speed up switch 170D and speed down switch 170E on remote control 166. The propeller direction will be that which was previously set by the operator using the direction switch 170F. In other words, center steering switch 170H causes the speed and propeller direction to be reset to their settings just before a steering operation began. Those settings are stored by motor control unit 154 to allow a reset to occur.

Center steering switch 170H can be pressed at any time, and will immediately cause the steering to return to a neutral condition in which motors 128L and 128R are in balance (i.e., they are both being driven in the same direction at the same speed). This is particularly advantageous when the operator has been required to make an abrupt turn, so that the thrust of the two motors may be very different or even in opposite directions. The use of a single switch (center steering switch 170H) makes the Return-to-Center feature easy to use and intuitive for the operator.

Figure 8:
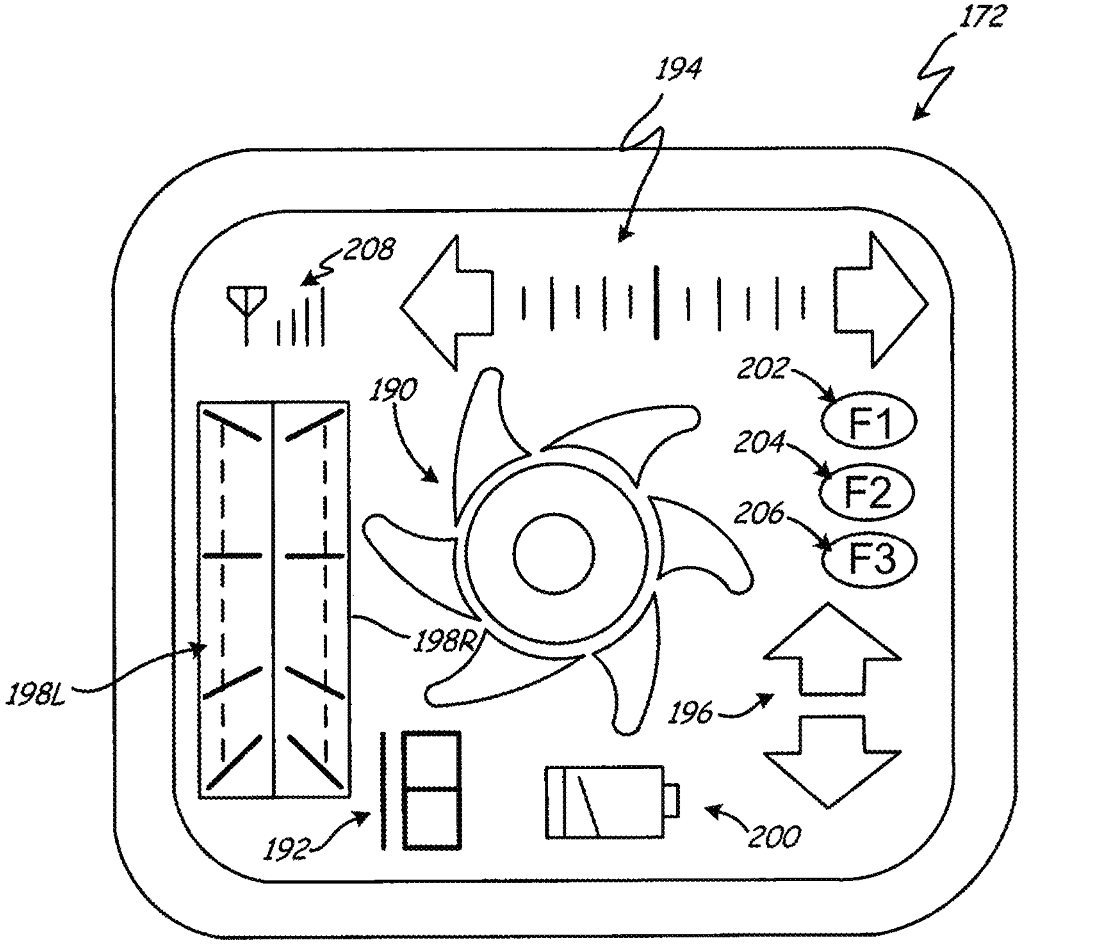
FIG. 8 is an enlarged view of the display of the remote control of FIG. 7.

FIG. 8 shows display 172, which includes status icons to provide visual feedback to the user of the operation of system 150. The status icons include propeller icon 190, prop speed icon 192, steering proportion icon 194, up/down icon 196, tab position icons 198L and 198R, battery status icon 200, special function icons 202, 204 and 206, and GPS signal quality icon 208.

Pressing prop switch 170A will cause the props to change state. Prop icon 190 has two states: (1) props are enabled—opposite pairs of prop blades alternately turn on and off to give the appearance of the prop rotating, and (2) props are disabled—one pair of prop blades is on constantly.

Pressing the speed up switch 170D or speed down switch 170E will cause the props' speed to increment or decrement by one step. The prop speed icon 192 will show values between "0" and "10" in whole number increments.

Pressing and holding steer left switch 170B or steer right switch 170° C. will cause the relative prop speeds to change, which will effect a change in side-to-side thrust. When switch 170B or 170C is released, this relative difference in thrust between the two motors will be maintained until another steering command is entered. Steering proportion icon 194 (with left and right arrows and hash marks in between) will display the current steering proportion.

Pressing center steering switch 170H will cause the steering proportion to go to an even value (or straight steering). Steering proportion icon 194 will change accordingly.

Pressing direction switch 170F will cause both propellers to change direction. Up/down arrow icon 196 will indicate the current direction of the propellers. This does not take into account if one of the propellers changes direction due to a hard steering condition.

Pressing trim/deploy switch 170G when trim tabs 126L and 126R are in trim range will cause the tabs to go into troll range. Pressing this button while the tabs are in troll range will cause the tabs to either move up or down within troll range. The direction of movement of the tabs in troll range changes with each press. Tab position icons 198L and 198R display current tab positions of trim tabs 126L and 126R, respectively.

Battery icon 200 indicates the status of battery 168, which powers remote control 166.

When one of the special function switches 1701-170K is pressed, corresponding icon 202, 204, or 206, respectively, indicates that the special function is activated. The special functions may be, for example, preset trim tab positions, preset motor speeds, or both.

GPS signal quality icon 208 provides an indication of GPS signal quality. The determination of GPS signal quality is made by a GPS receiver and sent via the bidirectional wireless link to remote control 166.

Downrigger System (FIGS. 9-13)

Figure 9:
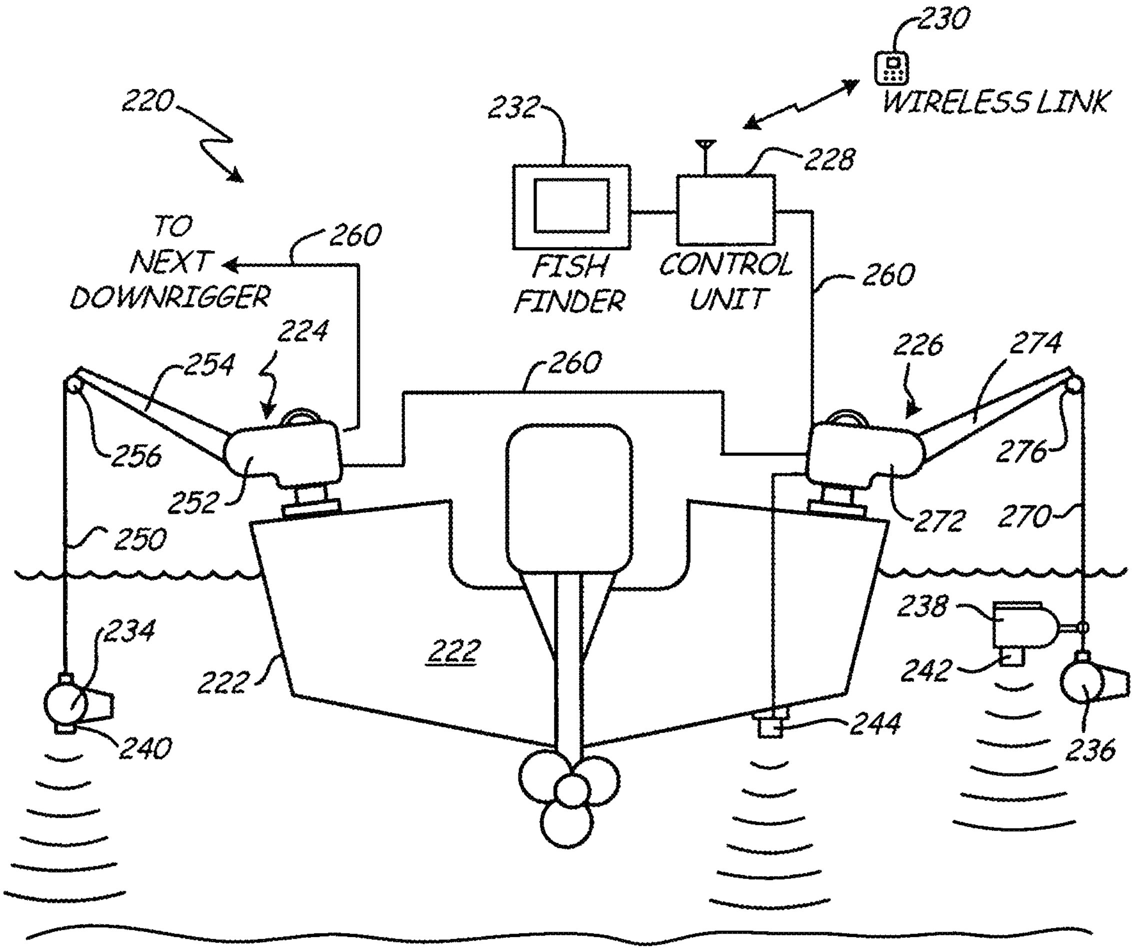
FIG. 9 is a schematic diagram of downrigger system having a bidirection communication link between a remote control and a control unit.

FIG. 9 shows downrigger system 220 mounted on boat 222. Downrigger system 220 includes downriggers 224 and 226, control unit 228, remote control 230, fish finder 232, downrigger balls 234 and 236, fish unit 238, and sonar transducers 240, 242, and 244.

Downriggers 224 and 226 are electric motor driven units capable of raising and lowering downrigger balls 234 and 236, respectively. Downrigger 224 is mounted on the port side of boat 222, while downrigger 226 is mounted on the starboard side of boat 222.

Downrigger ball 234 is suspended from downrigger line 250, which extends from motor drive 252, over downrigger arm 254 and pulley 256 and then downward to downrigger ball 234. Based upon control signals from control unit 228, downrigger 224 operates its electric drive to raise or lower ball 234.

As shown in FIG. 9, downrigger ball 234 carries sonar transducer 240, which directs a sonar beam downward to the bottom of the body of water, and receives sonar returns. Signals from sonar transducer 240 are supplied through downrigger line 250 to downrigger 224, and then are supplied through cable 260 to control unit 228.

Downrigger 226 receives control signals from control unit 228, and raises and lowers downrigger ball 236 attached to line 270 based upon the control signals. Like downrigger 224, downrigger 226 includes electric motor drive 272 for letting out or taking in line 270. Line 270 extends from electric motor drive 272, along downrigger arm 274, over pulley 276, and downward to downrigger ball 236. Attached to downrigger line 270 is fish unit 238, which is positioned above downrigger ball 236. Fish unit 238 may include speed and temperature sensors, and also carries sonar transducer 242. Signals from transducer 242 are supplied to downrigger 226 through downrigger line 270, and then are supplied over serial cable 260 to control unit 228.

FIG. 9 also shows sonar transducer 244, which is mounted on an outer or inner surface of boat 222. Signals from sonar transducer 244 are supplied to downrigger 226, and then are routed over serial cable 260 to control unit 228.

All of the sonar signals are supplied by control unit 228 to fish finder 232. Displays based upon signals from one or more of transducers 240, 242, and 244 are produced on the screen of fish finder 232.

Figure 10:
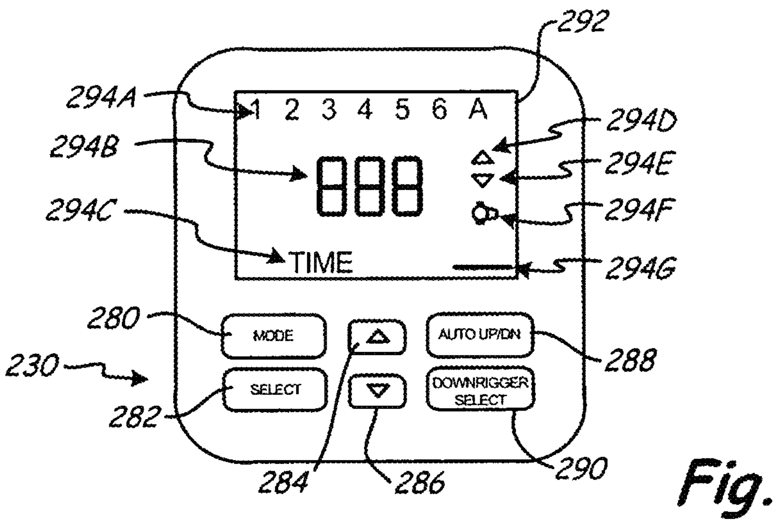
FIG. 10 shows the remote control of FIG. 9.

Remote control 230 and control unit 228 communicate through a bidirectional wireless link. As shown in FIG. 10, remote control 230 is a battery powered device including mode switch 280, select switch 282, up switch 284, down switch 286, auto up/down switch 288, downrigger select switch 290, and display 292. Switches 280-290 provide inputs that are sent by the wireless link to control unit 228 to control the operation of system 220. Control unit 228 provides status information that is sent back to remote control 230 through the wireless link. The status information is then displayed on display 292. In FIG. 10, all icons 294A-294G of display 292 are lit.

Mode switch 280 selects an operating mode for system 220. Three modes can be selected: Set Ball Depth, Cycle Ball, and Bottom Track.

Select switch 282 operates when system 220 is in the Cycle Ball mode. Selects switch 282 toggles between upper depth, lower depth, and cycle time.

Depending on what downrigger is selected, pressing auto up/down switch 288 will bring the ball associated with that downrigger up out of the water. Pressing auto up/down switch 288 again will put the ball back down to the appropriate depth depending on what mode is currently operating.

Downrigger select switch 280 allows a user to choose which downrigger to monitor and to edit operating parameters. In this example, six downriggers, designated 1 through 6, can be selected. Pressing downrigger select switch 290 cycles through downriggers 1 through 6 and A (which stands for "all").

Up and down switches 284 and 286 increase or decrease the numeric value that is displayed on screen 292. This can cause immediate action of system 220, depending on the downrigger and the value that are selected.

Figure 11A:
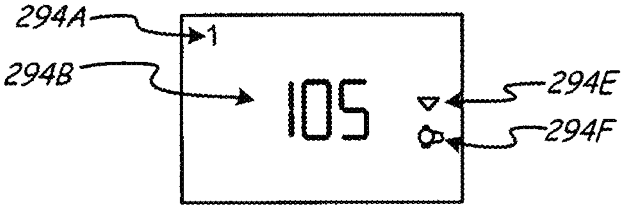
FIGS. 11A-11C show display screens in a Set Ball Depth mode.
Figure 11B:
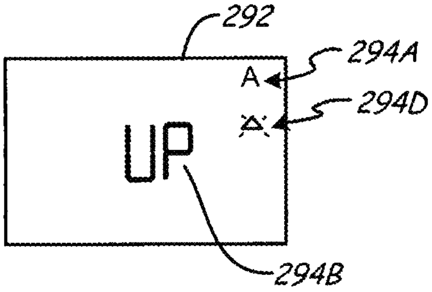
Figure 11C:
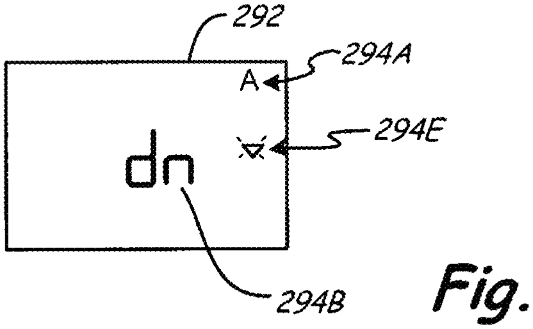

FIGS. 11A-11C show display 292 when system 220 is operating in the Set Ball Depth mode. FIG. 11A shows a display of current ball depth. Downrigger select icon 294A shows that downrigger 1 is selected. Alph-numeric icon 294B shows the current depth of 105 feet for downrigger 1. Ball icon 294F indicated that ball depth is being displayed.

Pressing up switch 284 or down switch 286 will raise or lower the downrigger ball. In FIG. 11A, down arrow icon 294 indicates that the ball is being lowered. Display 292 shown in FIG. 11A will update to the current depth. If up switch 284 is pressed, up arrow icon 294D will be displayed.

Through the use of downrigger select switch 290, display 292 shown in FIG. 11A can be switched to a different downrigger. Each of the downrigger depths can be reviewed, and balls can be individually raised or lowered while monitoring the current depth of the ball.

FIG. 11B shows the Set Ball Depth mode when the auto up/down switch 288 is pressed and all downriggers have been selected. Display 292 shows that all downriggers are going up. Downrigger select icon 294A shows the letter "A": alpha-numeric icon 294B displays the word "up"; and up arrow icon 294D flashes.

FIG. 11C shows display 292 when the user has pressed auto up/down switch 288 again to put all of the balls back down to their original position. Downrigger select icon 294A shows the current status with the letter "A" indicating that all downriggers are being operated. Display 292 indicates that the downrigger balls are moving downward by the letters "dn" at icon 294B and by flashing down arrow icon 294E.

Figure 12A:
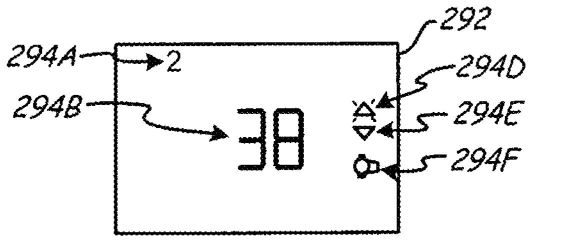
FIGS. 12A-12C show display screens in a Cycle Ball mode.
Figure 12B:
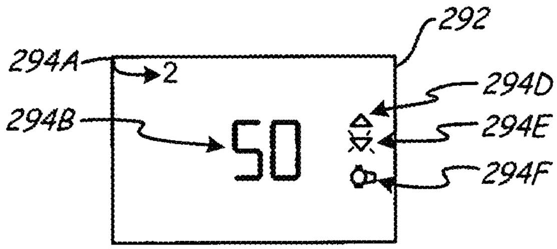
Figure 12C:
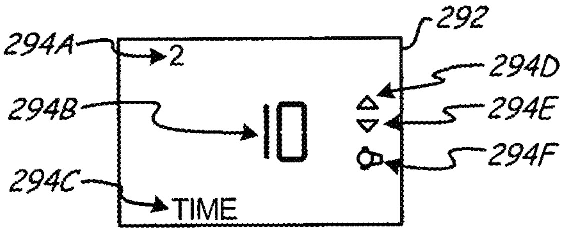

FIGS. 12A-12C illustrate display 292 during the cycle mode. In FIG. 12A, downrigger selection 294A indicates downrigger 2 is in the cycle mode. The upper height of the ball is set at 38 feet as shown by icon 294B. Upper arrow icon 294D is flashing, indicating that the upper depth value is being displayed.

Pressing select switch 282 will show the bottom depth limit, as illustrated in FIG. 12B. Bottom arrow icon 294E is now flashing, and the bottom depth limit for downrigger 2 is displayed as 50 feet by icon 294B.

Pressing select switch 282 again will display cycle time, which is the amount of delay time between going up and down. The cycle time display is shown in FIG. 12C and can be identified by time icon 294C. Display 292 shows that downrigger 2 has a 10 second time between up and down.

Figure 13:
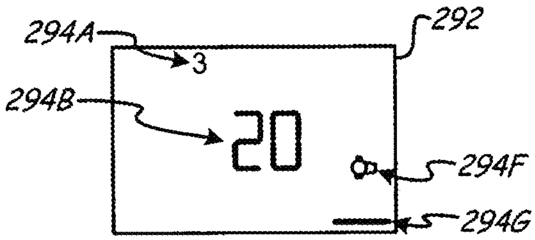
FIG. 13 shows a display screen in a Bottom Track mode

FIG. 13 illustrates display 292 during the Bottom Track mode, which can be identified by bottom icon 294G below ball icon 294F. As shown in FIG. 13, downrigger 3 is bottom tracking 20 feet off of the bottom. In order to provide this bottom tracking feature, each downrigger has a sonar transducer is used to compute depth. The sonar transducer may be carried by the ball, as illustrated by ball 234 and transducer 240, or may be carried by a fish unit, which provides underwater speed and temperature sensing data, such as fish unit 238 shown in FIG. 9.

CONCLUSION

The incorporation of a display into a remote control, and the use of a bidirectional wireless communication link between the remote control and a device controller allows the operator of a boat to receive real time status of the operation of marine devices. The invention is applicable to a variety of different marine devices of systems, such as trolling motors, trim tabs, downriggers, sonar devices and others.

Although the present invention has been described with reference to preferred embodiments, workers skilled in the art will recognize that changes may be made in form and detail without departing from the spirit and scope of the invention.

What is claimed is:

1. An autonavigation system for a trolling motor, comprising:

a controller configured to provide commands to the trolling motor and to receive status information from the trolling motor, the controller including a transceiver for wireless communication:

remote user interface devices including a foot pedal connected to the controller and a wireless handheld remote control paired with the controller via a learn function, the remote user interface devices each configured to communicate with the controller to control operation of the trolling motor based on user actuation of user interface buttons, the user interface buttons including basic control buttons, autonavigation buttons, and special function buttons included on at least one of the remote user interface devices, the basic control buttons including a propeller button for turning the propeller of the trolling motor on and off, a steer right button, a steer left button, a speed increase button, and a speed decrease button, the autonavigation buttons including a spot lock button to maintain a current GPS position, and the special function buttons including three individual buttons that may be programmed to perform different control functions, the remote user interface devices configured to generate input commands to be sent to the controller based on user selection of one of the basic control buttons, the autonavigation function buttons, or the special function buttons to control operation of the trolling motor; and wherein the controller is further configured to provide control signals to control the trolling motor, the control signals being generated based on signals received by the controller from at least one of the remote user interface devices; and wherein the learn function is initiated by simultaneous pressing of two of the user interface buttons.

2. The control system of claim 1, wherein the controller is configured to generate the control signals upon receipt of wireless communication from the remote control in response to user selection of the basic control buttons and the autonavigation function buttons.

3. The control system of claim 1, wherein the foot pedal is a wired foot pedal that is connected to the controller via a wired interface, and wherein the controller is configured to provide the signals generated by the wired foot pedal and received at a wired foot pedal input.

4. The control system of claim 1, wherein the controller is configured to generate the control signals to the trolling motor upon receipt of first input commands received via wireless communication from the remote control and upon receipt of second input commands received via wireless communication from the foot pedal.

5. The control system of claim 4, wherein the controller is configured to select between the first input commands from the remote control and the second input commands from the foot pedal based on priorities to provide commands to the trolling motor.

6. The control system of claim 1, wherein the foot pedal is a wireless foot pedal that is connected to the controller via a wireless interface.

7. The control system of claim 1, wherein the remote control includes the special function buttons that can be actuated by the user to enable preset functions for the trolling motor.

8. The control system of claim 1, wherein the controller is incorporated into a housing of the trolling motor and includes a main controller section to control the propeller on/off, speed, and steering of the trolling motor, and a radio section to provide bidirectional communication between the remote control and the main controller section.

9. The control system of claim 1, wherein the remote control includes beeper to provide audio feedback.

10. The control system of claim 1, wherein the controller is configured to maintain a speed setting set by the speed increase button and the speed decrease button such that when the trolling motor propeller is commanded on via the propeller button, the controller uses the speed setting to control the trolling motor.

11. The control system of claim 1, wherein the remote control includes a pixilated display, and wherein visual feedback is provided by images formed on the pixilated display.

12. The control system of claim 1, wherein the remote control synchronizes communication with the controller to enable power savings by depowering the transceiver during periods of non-communication.

13. The control system of claim 1, wherein the remote control and the controller are paired with one another via a unique identifier to ensure only control signals from paired remote controls or foot pedals are acted upon by the controller.

14. The control system of claim 1, further comprising:

a compass configured to provide heading data to the controller:

a GPS device configured to provide position data to the controller; and wherein the controller, in response to an input command from the remote control, is configured to provide commands to control the trolling motor in an autonavigation mode as a function of at least one of the heading data and the position data.

15. A control system, comprising:

a trolling motor having a controller, a compass, and a GPS receiver:

a wireless remote control and a foot pedal configured to generate input commands to control operation of the trolling motor, the wireless remote control including a visual display, the input commands being generated in response to user actuation of basic control buttons including a propeller button for turning the propeller on and off, a steer right button, a steer left button, a speed increase button, and a speed decrease button, the input commands further being generated in response to user actuation of special autonavigation function buttons including a spot lock button to maintain a current GPS position, the input commands further being generated in response to user actuation of special function buttons including three individual buttons that may be programmed to perform different control functions; and wherein the controller is configured to control an operational status, steering, and speed of the trolling motor, the controller having a foot pedal input configured to receive the input commands from the foot pedal, the controller further including a transceiver for wireless communication with the wireless remote control to receive the input commands from the wireless remote control once paired therewith, the control signals being generated based on at least one of the input commands from the wireless remote control or the input commands from the foot pedal, the controller further configured to provide the control signals to the trolling motor.

16. The control system of claim 15, wherein the foot pedal is a wireless foot pedal.

17. The control system of claim 15, wherein the controller is configured to generate the control signals to control the trolling motor upon receipt of the wireless input commands received via wireless communication from the remote control and upon receipt of the input commands received from the foot pedal.

18. The control system of claim 15, wherein the controller is configured to select between the wireless input commands from the remote control and the input commands from the foot pedal based on priorities to provide the control signals to the trolling motor.

19. The control system of claim 15, wherein the wireless remote control is paired to the controller via a learning function initiated by simultaneous pressing of two of the basic control buttons.

* * * * *